United States Patent
Hyoung et al.

(10) Patent No.: US 9,525,310 B2
(45) Date of Patent: Dec. 20, 2016

(54) ENERGY HARVESTING DEVICE USING ELECTROMAGNETIC INTERFERENCE SIGNAL AND SENSOR SYSTEM INCLUDING THE SAME

(71) Applicant: Electronics and Telecommunications Research Institute, Daejeon (KR)

(72) Inventors: Chang Hee Hyoung, Daejeon (KR); Sung Weon Kang, Daejeon (KR); Jung Hwan Hwang, Daejeon (KR); In Gi Lim, Daejeon (KR); Jung Bum Kim, Daejeon (KR); Kyung Soo Kim, Daejeon (KR); Kyung Hwan Park, Daejeon (KR); Hyung-Il Park, Daejeon (KR); Tae Young Kang, Seoul (KR); Sung Eun Kim, Seoul (KR); Tae Wook Kang, Daejeon (KR); Byoung Gun Choi, Daegu (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 671 days.

(21) Appl. No.: 13/655,265

(22) Filed: Oct. 18, 2012

(65) Prior Publication Data
US 2013/0099676 A1    Apr. 25, 2013

(30) Foreign Application Priority Data

Oct. 19, 2011  (KR) .................. 10-2011-0106783
Sep. 13, 2012  (KR) .................. 10-2012-0101634

(51) Int. Cl.
H05B 41/36   (2006.01)
H02J 17/00   (2006.01)

(52) U.S. Cl.
CPC ..................... *H02J 17/00* (2013.01)

(58) Field of Classification Search
USPC ......................................... 315/155
See application file for complete search history.

(56) References Cited

U.S. PATENT DOCUMENTS

2005/0281030 A1* 12/2005 Leong et al. ................. 362/234
2010/0014297 A1*  1/2010 Ijzerman ................. H05B 3/008
                                                                  362/346

(Continued)

FOREIGN PATENT DOCUMENTS

JP      10146077 A  *  5/1988
JP      10-146077 A     5/1998

(Continued)

*Primary Examiner* — Lincoln Donovan
*Assistant Examiner* — Patrick Chen

(57) ABSTRACT

Provided are an energy harvesting device capable of generating electric energy by effectively obtaining an electromagnetic wave emitted from an indoor lighting device and a power control system of a lighting device capable of performing self-power generation by using the energy harvesting device as a power source. The energy harvesting device using an electromagnetic wave according to an exemplary embodiment of the present disclosure includes: an interface unit made of a conductive material and configured to capture a conductive interference signal transferred through a conductive member of a lighting device; and a rectifier circuit unit configured to rectify the captured conductive interference signal to convert the rectified conductive interference signal to direct current power.

19 Claims, 3 Drawing Sheets

(56) References Cited

U.S. PATENT DOCUMENTS

2010/0253156 A1* 10/2010 Iott et al. ...................... 307/149
2010/0284086 A1    11/2010 Novack et al.

FOREIGN PATENT DOCUMENTS

JP           2010-506071  A        2/2010
KR      1020100021350  A   *   2/2010

* cited by examiner

ENERGY HARVESTING DEVICE USING ELECTROMAGNETIC INTERFERENCE SIGNAL AND SENSOR SYSTEM INCLUDING THE SAME

CROSS-REFERENCE TO RELATED APPLICATIONS

This application is based on and claims priority from Korean Patent Application No. 10-2011-0106783, filed on Oct. 19, 2011, and Korean Patent Application No. 10-2012-0101634, filed on Sep. 13, 2012, with the Korean Intellectual Property Office, the disclosure of which is incorporated herein in its entirety by reference.

TECHNICAL FIELD

The present disclosure relates to a device for harvesting energy by using an electromagnetic wave or a conductive interference signal of an electronic device, such as a lighting device, generating a high-voltage interference signal and a sensor system including the device.

BACKGROUND

An energy harvesting technology corresponds to a field of harvesting energy from a peripheral environment, and is a technology for converting peripheral energy to electric energy usable for driving a circuit. The energy harvesting technology has a characteristic in that the technology enables a circuit to be operated without a battery or a charging of a battery by using separate power, so that the technology can be used as power or auxiliary power of various sensors and a communication device using the sensor, and an application scope thereof is considerably wide. The energy harvesting technology is also a future industry field capable of preserving a natural environment by efficiently re-using energy discarded in a peripheral area.

A method of harvesting energy from light of a natural environment by using a solar cell has been most widely known as the energy harvesting technology. However, the aforementioned method has very low energy efficiency obtainable under an indoor environment, such as a building, and demands a too large area to be applied to a small circuit device, so a field to which the method is applicable is limited. Recently, research on the harvesting of energy by various methods, such as a method of harvesting energy by using vibration or a temperature difference and a method of harvesting energy by receiving an electromagnetic signal by using an antenna having a size of [mm] is in progress.

In the meantime, lighting devices presently used in an indoor space have large power consumption in the amount of several tens of Watts for each device, and a part of power input to the lighting device is not converted to light, but is radiated as heat and an electromagnetic wave. Accordingly, large power can be harvested if the electromagnetic waves emitted from the lighting devices are used as an energy resource. A fluorescent light which has been the most widely used currently is classified into a magnetic ballast type and an electronic ballast type according to a driving method, and the magnetic ballast type emits an electromagnetic wave of a frequency of 60 Hz and the electronic ballast type emits an electromagnetic wave of a band of several tens of kHz according to a driving characteristic. However, in a case where the antenna type in the related art is used, there is a problem in that it is almost impossible to implement an antenna capable of absorbing an electromagnetic wave of such a low frequency band and harvest the emitted electromagnetic wave due to a spatial limitation.

SUMMARY

The present disclosure has been made in an effort to provide an energy harvesting device capable of generating electric energy by effectively harvesting an electromagnetic wave emitted from an indoor lighting device, and a sensor system capable of performing self-power generation by using the energy harvesting device as a power source.

An exemplary embodiment of the present disclosure provides an energy harvesting device using an electromagnetic wave, including: an interface unit made of a conductive material and configured to capture a conductive interference signal transferred through a conductive member of a lighting device; and a rectifier circuit unit configured to rectify the captured conductive interference signal to convert the rectified conductive interference signal to direct current power.

Another exemplary embodiment of the present disclosure provides an energy harvesting device using an electromagnetic wave, including: an interface unit made of a conductive material and configured to capture a conductive interference signal transferred through a conductive member of a lighting device; one or more filters configured to filter the captured conductive interference signal for each predetermined frequency band to generate one or more alternating current signals; and one or more rectifier circuit units configured to rectify each of the one or more alternating current signals to convert the rectified alternating current signal to direct current power.

The conductive member may be a reflective plate or louvers or a supporting board having conductivity of the lighting device, and the interface unit may be coupled to the conductive member.

In the conductive member, a material having an insulating characteristic may be included in a surface of the member having conductivity. Even though the surface includes the material having the insulating characteristic, a signal may be transferred by capacitive coupling with the interface having conductivity.

Yet another exemplary embodiment of the present disclosure provides a sensor system, including: an energy harvesting device configured to generate direct current power by using a conductive interference signal transferred through a conductive member of a lighting device; and a sensor unit driven by the direct current power generated by the energy harvesting device.

Still another exemplary embodiment of the present disclosure provides a sensor system, including: an energy harvesting device configured to generate direct current power by using a conductive interference signal transferred through a conductive member of a lighting device; a sensor unit configured to sense whether there is a user within a predetermined space; and a power control unit configured to control power of the lighting device by using a sensing result of the sensor unit, in which at least one of the sensor unit and the power control unit is driven by the direct current power generated in the energy harvesting device.

The energy harvesting device may further include: a voltage boosting unit configured to boost a voltage generated by the rectifier circuit unit to a voltage required for driving the sensor unit or the power control unit; and a charging unit configured to store surplus power and supply the stored power to the sensor unit or the power control unit when needed.

The sensor system may further include a communication unit for wired/wireless data communication between the lighting device, the sensor unit and the power control unit, and the communication unit may be driven by the direct current power generated by the energy harvesting device.

According to the present disclosure, electric power is generated by using an electromagnetic wave emitted through a conductive member of a lighting device or an electronic device generating a high voltage, so that it is possible to harvest considerably larger electric power compared to an existing case in which an electromagnetic wave radiated from a communication device, such as a mobile phone, a wireless LAN and Bluetooth, is used.

The present disclosure obtains a conductive interference signal transferred through an interface made of a conductive material, not an antenna structure, so that it is possible to implement an energy harvesting device capable of being microminiaturized and being easily coupled to an existing lighting device.

By using the energy harvesting device as a power source, it is possible to implement various sensor systems capable of performing self-power generation and remarkably reduce complexity of the system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
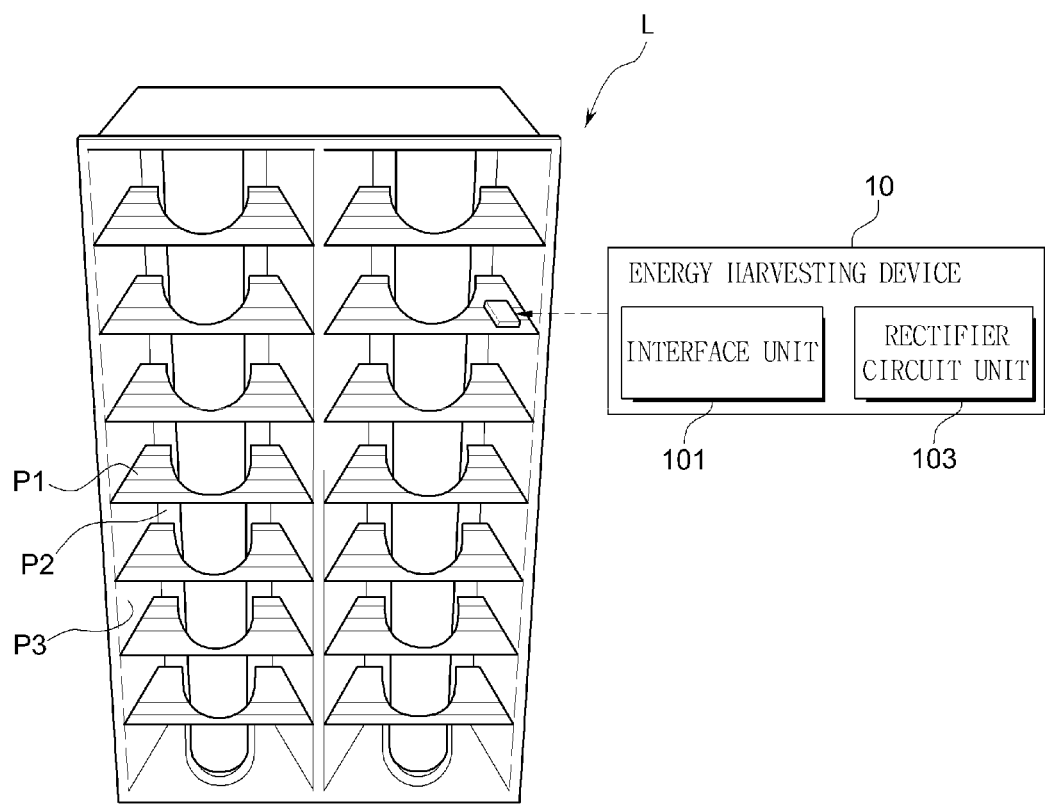
FIG. 1 is a configuration diagram illustrating an energy harvesting device using an electromagnetic wave according to an exemplary embodiment of the present disclosure.

FIG. 1 is a configuration diagram illustrating an energy harvesting device using an electromagnetic wave according to an exemplary embodiment of the present disclosure.

Referring to FIG. 1, an energy harvesting device 10 according to an exemplary embodiment of the present disclosure includes an interface unit 101 made of a conductive material and configured to capture a conductive interference signal transferred through conductive members P1 to P3 of a lighting device L, and a rectifier circuit unit 103 configured to rectify the captured conductive interference signal to convert the rectified conductive interference signal to direct current power.

The conductive members P1 to P3 may be reflective plates or louvers used for more efficiently giving light to a necessary point in the lighting device L or supporting boards used for stably installing the lighting device L on a ceiling, or the like. The reflective plate or louvers or the supporting board is generally formed of a material having conductivity, such as metal, so that an electromagnetic wave is well induced. A surface of the reflective plate or louvers or the supporting board may be formed of an insulating film for a reason of corrosion or appearance or for safety. Although the insulating film is formed, the interference signal may be obtained through capacitive coupling with the interface made of the conductive material. The present disclosure obtains the conductive interference signal transferred through the conductive members P1 to P3 of the lighting device L by coupling the interface unit 101 of the energy harvesting device 10 to the conductive members P1 to P3, so that it is possible to obtain more electromagnetic waves emitted from the lighting device L compared to the existing method using an antenna, improve efficiency of obtaining the electromagnetic waves, and implement a very small energy harvesting device.

The interface unit 101 may include an adhesive part or a magnetic part including a magnetic material so as to be easily coupled to or separated from the conductive members P1 to P3, and may be formed of a conductive material, such as metal, a flexible substrate, conductive fiber and an ECG electrode, in order to effectively obtain the conductive interference signal transferred through the conductive members P. In order to transfer much more electric power to the rectifier circuit unit from an interference signal source, an impedance matching circuit may be inserted between the interface and the rectifier circuit unit, and the matching circuit may be implemented by using a pattern of the interface.

Figure 2:
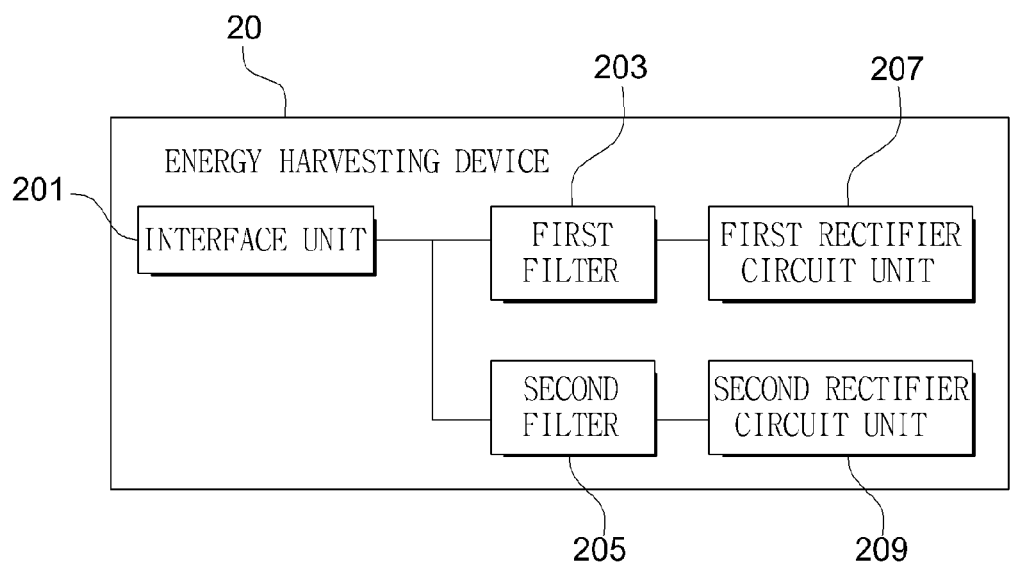
FIG. 2 is a configuration diagram illustrating an energy harvesting device using an electromagnetic wave according to another exemplary embodiment of the present disclosure.

FIG. 2 is a configuration diagram illustrating an energy harvesting device using an electromagnetic wave according to another exemplary embodiment of the present disclosure.

Referring to FIG. 2, an energy harvesting device 20 according to another exemplary embodiment of the present disclosure includes an interface unit 201 made of a conductive material and configured to capture a conductive interference signal transferred through a conductive member of a lighting device, one or more filters 203 and 205 configured to filter the captured conductive interference signal for each predetermined frequency band to generate one or more alternating current signal, and one or more rectifier circuit units 207 and 209 configured to rectify each of the one or more alternating current signals to convert the rectified alternating signal(s) to direct current power. In the present exemplary embodiment, it is assumed that there are two filters 203 and 205 and two rectifier circuit units 207 and 209.

Since the conductive interference signal obtained through the interface unit 201 may include frequency components of various bands, the energy harvesting device may more efficiently generate much more direct current power by using the rectifier circuit units 207 and 209 corresponding to the filtered conductive interference signals after filtering the conductive interference signal of a specific frequency band through the filters 203 and 205. The filter may be designed considering input and output impedance, and in this case, an additional impedance matching circuit is not required. Only in a case where the filter is designed to have a specific impedance, for example, 50Ω or 75Ω, the impedance matching circuit for transferring and harvesting maximum electric power may be inserted in the input or the output of the filter.

A fluorescent light most widely used as a lighting device generally includes a ballast for stable light emission, and is classified into a magnetic or hybrid ballast type operated with an alternating current frequency at 60 Hz of an electric power line and an electronic ballast type operated by converting the alternating current frequency at 60 Hz to a high frequency between 20 to 60 kHz according to a driving method. The filters 203 and 205 may be implemented according to a driving frequency of the ballast. For example, a low pass filter may be used in a lighting device using a magnetic or hybrid ballast. In the lighting device using the electronic ballast, an electromagnetic wave signal of a band at 60 Hz emitted from an electric power line and an electromagnetic wave signal of a band between 20 to 60 kHz are input together, so that it may be difficult to stably harvest energy due to constructive and destructive interference between the two bands. Accordingly, the lighting device using the electronic ballast may separate a signal of a band at 60 Hz by implementing the first filter 203 as a low pass filter, separate a signal of a band of several tens of kHz by implementing the second filter 205 as a band pass filter or a high pass filter, and then obtain direct current power by using the first and second rectifier circuit units 207 and 209 corresponding to each signal.

Here, it is apparent that a type and the number of filters, a frequency band filtered by each filter, the number of rectifier circuit units and the like may be changed according to a situation. Known methods like maximum power point tracking to obtain maximum electric power in combining voltages obtained through the multiple rectifier circuit units may be variously applied.

The interface unit 201 may include an adhesive part or a magnetic part so as to be easily coupled to the conductive member, and may be formed of a conductive material. This is the same as the description given with reference to FIG. 1.

Figure 3:
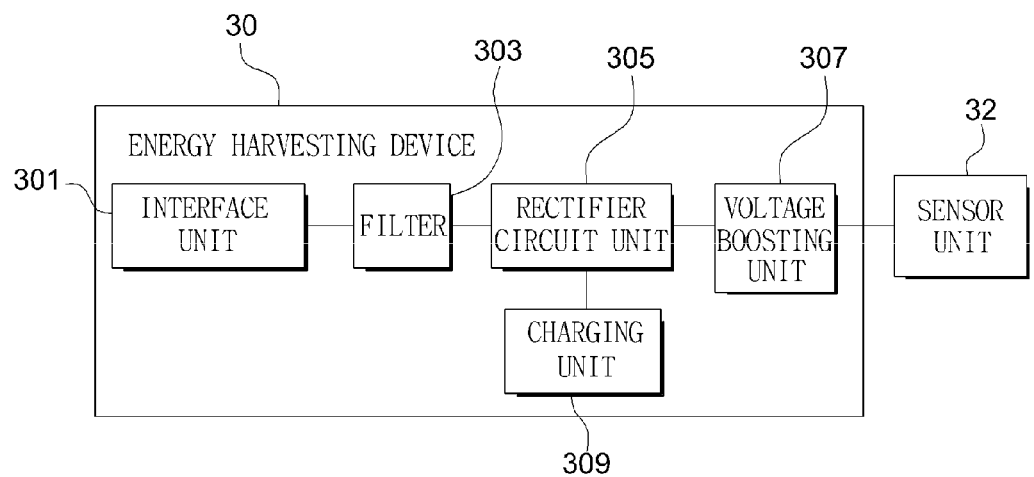
FIG. 3 is a diagram illustrating an example in which an energy harvesting device according to the present disclosure is applied to a sensor system.

FIG. 3 is a diagram illustrating an example in which an energy harvesting device according to the present disclosure is applied to a sensor system.

Recently, in order to efficiently manage a building, the building includes various sensors configured to sense a position or movement of an object or a person, temperature, humidity, carbon dioxide and the like, and in order to supply electric power to the sensors, power supply needs to be considered from a stage of designing the building. In a case where the energy harvesting device of the present disclosure is used, the energy harvesting device is attached to pre-installed multiple lighting devices, so that it is possible to easily implement a sensor system capable of performing self-power generation without power supply from an outside source or a separate battery.

Referring to FIG. 3, a sensor system according to an exemplary embodiment of the present disclosure includes an energy harvesting device 30 configured to generate direct current power by using a conductive interference signal transferred through a conductive member of a lighting device and a sensor unit 32 driven by the direct current power generated in the energy harvesting device 30. The sensor unit 32 may have a function of sensing a position or movement of an object or a person, temperature, humidity or carbon dioxide within a predetermined space, and may be implemented by a wireless sensor network including multiple wireless sensor nodes.

The energy harvesting device 30 includes an interface unit 301 made of a conductive material, a filter 303 and a rectifier circuit unit 305, and may further include a voltage boosting unit 307 and a charging unit 309. When a voltage generated by the rectifier circuit unit 305 is lower than a voltage required for driving the sensor unit 32, the energy harvesting device 30 may supply power by boosting the voltage to a voltage demanded in a load by using the voltage boosting unit 307. The energy harvesting device 30 may store surplus electric power through the charging unit 309 and supply the stored electric power to a load later.

A sensor network system may be formed by adding a communication function to various sensors including the energy harvesting device of the present disclosure, and a connection configuration thereof may be selectively implemented according to a used sensor, communication module and the like.

In the meantime, a smart lighting system capable of automatically performing a control of on/off of a lighting device by combining the lighting device and a movement detecting sensor and the like has been widely used recently. According to the CMOS technology, a CMOS is continuously down scaled, which now can be designed up to a size of 45 to 65 nm, and a demanded driving voltage of a circuit is decreased up to 0.8 V or lower. Accordingly, a demanded electric power quantity is also considerably decreased, so that it is possible to construct a wireless sensor network only with minimum driving power in a unit of μW or lower. Accordingly, when the energy harvesting device according to the present disclosure is applied to the system and used as auxiliary power, it is expected to simultaneously improve electric power use efficiency and remarkably reduce complexity of a lighting system.

Figure 4:
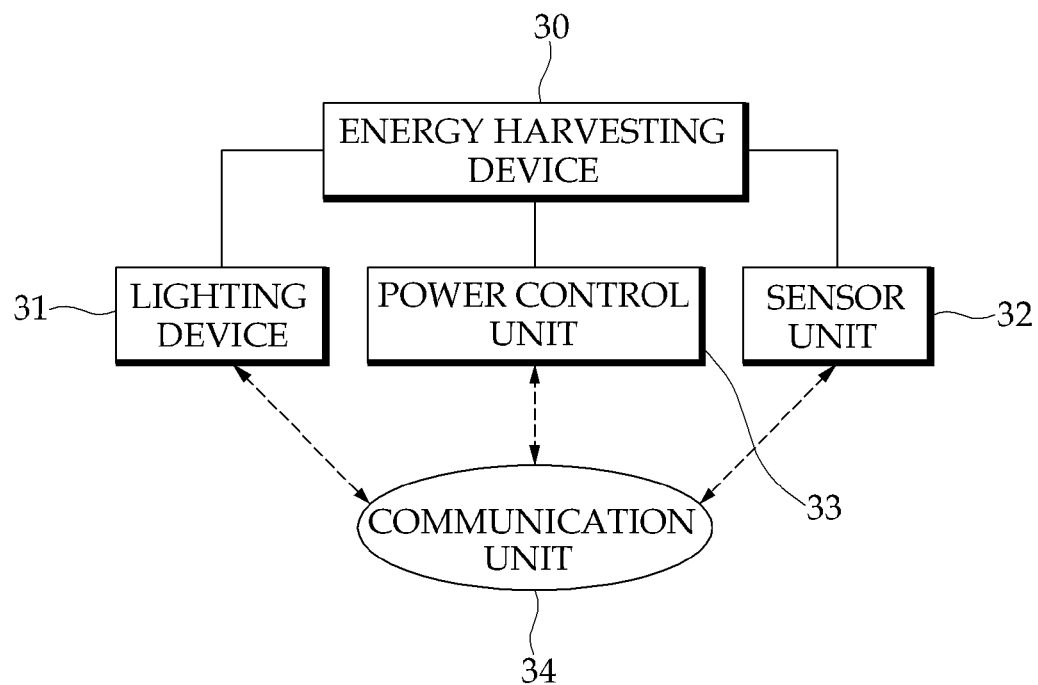
FIG. 4 is a configuration diagram illustrating a sensor system configured to provide a function of a power control of a lighting device according to an exemplary embodiment of the present disclosure.

FIG. 4 is a configuration diagram illustrating a sensor system configured to provide a function of a power control of a lighting device according to an exemplary embodiment of the present disclosure.

Referring to FIG. 4, the sensor system according to the present exemplary embodiment includes the energy harvesting device 30 configured to generate direct current power by using the conductive interference signal transferred through the conductive member of the lighting device 31, the sensor unit 32 configured to sense whether there is a user within a predetermined space, and a power control unit 33 configured to control power of the lighting device 31 by using the sensing result of the sensor unit 32. Here, at least one of the sensor unit 32 and the power control unit 33 may be driven by the direct current power generated in the energy harvesting device 30. The sensor system may further include a communication unit 34 for wired/wireless data communication between the lighting device 31, the sensor unit 32 and the power control unit 33.

The sensor unit 32 may include one or more movement detecting sensors or infrared sensors, and may be implemented by a sensor network including multiple wireless sensor nodes.

The energy harvesting device 30 includes, as illustrated in FIG. 3, the interface unit 301 made of a conductive material, the filter 303 and the rectifier circuit unit 305, and may further include the voltage boosting unit 307 and the charging unit 309. When a voltage generated by the rectifier circuit unit 305 is lower than a voltage required for driving the sensor unit 32, the power control unit 33 or the communication unit 34, the energy harvesting device 30 may supply power by boosting the voltage to a voltage demanded in a load by using the voltage boosting unit 307. The energy harvesting device 30 may store surplus electric power through the charging unit 309 and supply the stored electric power to a load later. A connection configuration thereof may be selectively implemented according to a characteristic of a used sensor and communication module.

From the foregoing, it will be appreciated that various embodiments of the present disclosure have been described herein for purposes of illustration, and that various modifications may be made without departing from the scope and spirit of the present disclosure. Accordingly, various embodiments disclosed herein are not intended to be limiting, with the true scope and spirit being indicated by the following claims.

What is claimed is:

1. An energy harvesting device using an electromagnetic wave, comprising:
   an interface unit including a conductive material and coupled to a conductive member of a lighting device, a conductive interference signal being transmitted through the conductive member to the interface unit; and
   a rectifier circuit unit configured to rectify the transmitted conductive interference signal and convert the rectified conductive interference signal into direct current power,
   wherein the conductive member is a reflective plate or a louver, and
   wherein the lighting device is a fluorescent light, and the reflective plate or the louver reflects visible light emitted from the fluorescent light.

2. The energy harvesting device of claim 1, wherein the energy harvesting device is disposed on a surface of the conductive member, and wherein the interface unit comprises an adhesive part or a magnetic part that couples the energy harvesting device to the conductive member.

3. The energy harvesting device of claim 1, wherein the energy harvesting device further includes one or more filters each configured to filter the transmitted conductive interference signal for a corresponding one of predetermined frequency bands to generate a corresponding one of alternating current signals,
   wherein the one or more filters each include one of a low pass filter, a band pass filter and a high pass filter,
   wherein the low pass filter extracts a first signal component of a band at 60 Hz, and
   wherein the band pass filter, the high pass filter, or both, extracts a second signal component of a band between 20 kHz to 60 kHz.

4. An energy harvesting device using an electromagnetic wave, comprising:
   an interface unit including a conductive material and coupled to a conductive member of a lighting device, a conductive interference signal being transmitted through the conductive member to the interface unit;
   one or more filters each configured to filter the transmitted conductive interference signal for a corresponding one of predetermined frequency bands to generate a corresponding one of alternating current signals; and
   one or more rectifier circuit units each configured to rectify a corresponding one of the alternating current signals and convert the rectified alternating current signals into direct current power,
   wherein the conductive member is a reflective plate or a louver, and
   wherein the lighting device is a fluorescent light, and the reflective plate or the louver reflects visible light emitted from the fluorescent light.

5. The energy harvesting device of claim 4, wherein the energy harvesting device is disposed on a surface of the conductive member, and wherein the interface unit comprises an adhesive part or a magnetic part that couples the energy harvesting device to the conductive member.

6. The energy harvesting device of claim 4, wherein the one or more filters each include one of a low pass filter, a band pass filter and a high pass filter, and
   wherein the low pass filter extracts a first signal component of a band at 60 Hz, and
   wherein the band pass filter, the high pass filter, or both, extracts a second signal component of a band between 20 kHz to 60 kHz.

7. A sensor system, comprising:
   an energy harvesting device including:
      an interface unit including a conductive material and coupled to a conductive member of a lighting device, a conductive interference signal being transmitted through the conductive member to the interface unit; and
      a rectifier circuit unit configured to rectify the transmitted conductive interference signal and convert the rectified conductive interference signal into direct current power; and
   a sensor unit driven by the direct current power generated by the energy harvesting device,
   wherein the conductive member is a reflective plate or a louver, and
   wherein the lighting device is a fluorescent light, and the reflective plate or the louver reflects visible light emitted from the fluorescent light.

8. The sensor system of claim 7, wherein the energy harvesting device further includes:
   one or more filters each configured to filter the transmitted conductive interference signal for a corresponding one of predetermined frequency bands to generate a corresponding one of alternating current signals.

9. The sensor system of claim 8, wherein the energy harvesting device further includes:
   a voltage boosting unit configured to boost a voltage generated by the rectifier circuit unit to a target voltage to drive the sensor unit; and
   a charging unit configured to store surplus electric power and supply the stored electric power to the sensor unit.

10. The sensor system of claim 8, wherein the one or more filters each include one of a low pass filter, a band pass filter and a high pass filter,
   wherein the low pass filter extracts a first signal component of a band at 60 Hz, and
   wherein the band pass filter, the high pass filter, or both, extracts a second signal component of a band between 20 kHz to 60 kHz.

11. The sensor system of claim 7, wherein the sensor unit senses any one of a position or movement of an object or a person, temperature, humidity, carbon dioxide, and a combination thereof within a specific space.

12. The sensor system of claim 7, wherein the sensor unit is included in a wireless sensor network that has multiple wireless sensor nodes.

13. A sensor system, comprising:
   an energy harvesting device including:
      an interface unit including a conductive material and coupled to a conductive member of a lighting device, a conductive interference signal being transmitted through the conductive member to the interface unit; and
      a rectifier circuit unit configured to rectify the transmitted conductive interference signal and convert the rectified conductive interference signal into direct current power;
   a sensor unit configured to sense whether there is a person or an object within a predetermined space; and a power control unit configured to control power of the lighting device by using a sensing result of the sensor unit, wherein at least one of the sensor unit and the power control unit is driven by the direct current power generated by the energy harvesting device, and wherein the conductive member is a reflective plate or a louver, and wherein the lighting device is a fluorescent light, and the reflective plate or the louver reflects visible light emitted from the fluorescent light.

14. The sensor system of claim 13, wherein the energy harvesting device further includes:
one or more filters each configured to filter the transmitted conductive interference signal for a corresponding one of predetermined frequency bands to generate a corresponding one of alternating current signals.

15. The sensor system of claim 14, wherein the energy harvesting device further includes:
a voltage boosting unit configured to boost a voltage generated by the rectifier circuit unit to a target voltage to drive the sensor unit, the power control unit, or both; and
a charging unit configured to store surplus electric power and supply the stored electric power to the sensor unit, the power control unit, or both.

16. The sensor system of claim 14, wherein the one or more filters each include one of a low pass filter, a band pass filter and a high pass filter,
wherein the low pass filter extracts a first signal component of a band at 60 Hz, and
wherein the band pass filter, the high pass filter, or both, extracts a second signal component of a band between 20 kHz to 60 kHz.

17. The sensor system of claim 13, wherein the sensor unit comprises a movement detecting sensor, an infrared sensor, or both.

18. The sensor system of claim 13, further comprising:
a communication unit configured to perform data communication with the lighting device, the sensor unit and the power control unit.

19. The sensor system of claim 18, wherein the communication unit is driven by the direct current power generated by the energy harvesting device.

* * * * *